(12) United States Patent
Jordan et al.

(10) Patent No.: US 7,988,590 B2
(45) Date of Patent: Aug. 2, 2011

(54) PAWL FOR A PLANETARY GEAR MECHANISM

(75) Inventors: Brian Jordan, Chicago, IL (US); Christopher Shipman, Chicago, IL (US); Kevin Wesling, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 771 days.

(21) Appl. No.: 12/106,898

(22) Filed: Apr. 21, 2008

(65) Prior Publication Data
US 2009/0260476 A1   Oct. 22, 2009

(51) Int. Cl.
*F16H 3/44* (2006.01)
*F16D 23/00* (2006.01)
*F16D 43/00* (2006.01)

(52) U.S. Cl. .............................. 475/312; 192/46; 192/64
(58) Field of Classification Search ............. 192/64
See application file for complete search history.

(56) References Cited

U.S. PATENT DOCUMENTS

| 1,277,070 A | 8/1918 | Harrison |
| 3,540,309 A | 11/1970 | Shimano et al. |
| 4,059,028 A | 11/1977 | Schulz |
| 7,484,605 B2 * | 2/2009 | Pawley et al. ............... 192/43.1 |
| 2007/0089960 A1 * | 4/2007 | Kanehisa ...................... 192/64 |
| 2008/0252037 A1 | 10/2008 | Wesling et al. |
| 2008/0254929 A1 | 10/2008 | Wesling et al. |
| 2008/0300096 A1 | 12/2008 | Wesling et al. |

FOREIGN PATENT DOCUMENTS

| DE | 199 51 399 A1 | 5/2001 |
| EP | 0 471 349 A1 | 2/1992 |
| EP | 0 687 622 A1 | 12/1995 |
| EP | 1 980 483 A1 | 10/2008 |
| EP | 1 980 484 A1 | 10/2008 |
| FR | 806 045 | 12/1936 |
| GB | 2 270 129 A | 3/1994 |
| GB | 2 424 046 | 9/2006 |

* cited by examiner

*Primary Examiner* — Edwin A Young
(74) *Attorney, Agent, or Firm* — Milan Milosevic; Lisa Serdynski; Steven Courtright

(57) ABSTRACT

A pawl for controlling the rotation of a gear in a planetary gear mechanism. The pawl includes a nose and first and second pivot axes. The nose is engageable with the gear. The pawl is rotatable about the first pivot axis between a first mode permitting rotation of the gear in a first direction and a second direction and a second mode preventing rotation of the gear in the first direction. The pawl is rotatable about the second pivot axis to permit rotation of the gear in the second direction while the pawl is the second mode.

17 Claims, 9 Drawing Sheets

PAWL FOR A PLANETARY GEAR MECHANISM

BACKGROUND OF THE INVENTION

The present invention relates to pawls for controlling the rotation of gears in a planetary gear mechanism and more particularly to a pawl that includes two pivots.

SUMMARY OF THE INVENTION

A pawl is provided to control the rotation of a gear of a planetary gear mechanism. The pawl includes a nose for engaging the gear and first and second pivots. The pawl is rotatable about the first pivot axis between a first mode, permitting rotation of the gear in a first direction and a second direction, and a second mode preventing rotation of the gear in the first direction. The pawl is rotatable about the second pivot to permit rotation of the gear in the second direction while the pawl is in the second mode.

In one embodiment of the present invention, the pawl is used in a control system for a bicycle planetary gear mechanism that includes a plurality of gears. The control system generally includes the pawl, a first seat for the pawl and a shift actuator. The pawl is biased about the first pivot axis toward the first mode and biased about the second pivot axis toward the second mode. The pawl may be biased at a pawl lobe about the first pivot axis toward the first mode and biased at the pawl lobe about the second pivot axis toward the second mode. Alternatively, a separate pawl lobe may be used to bias the pawl about the second pivot axis toward the second mode. The pawl lobe may be disposed between the first and second pivot axes. The pawl may be biased by one or more springs. The shift actuator positions the pawl between the first and second modes. The shift actuator includes a shift cam received in a second seat, the shift cam reciprocally displaceable along the second seat to position the pawl between the first and second modes.

The gear includes a toothed profile configured to engage the nose of the pawl. The gear toothed profile and the nose of the pawl are configured such that a first engagement force between the nose and the gear toothed profile, preventing rotation of the gear in the first direction, biases the pawl toward the first mode. Further, the gear toothed profile and the nose of the pawl are configured such that a second engagement force between the nose and the gear toothed profile biases the pawl about the second pivot axis toward the second mode, permitting rotation of the gear in the second direction.

The planetary gear mechanism includes a sun gear, a plurality of planet gears and a ring gear. The gear is the sun gear. The planetary gear mechanism is configured such that when the pawl is in the second mode, a drive input drives the planet gears to overdrive the ring gear in a first transmission path. The planetary gear mechanism is configured such that when the pawl is in the first mode, the drive input drives the planet gears to rotate the sun gear and the ring gear in a second transmission path.

These and other features and advantages of the present invention will be more fully understood from the following description of one or more embodiments of the invention, taken together with the accompanying drawings.

DETAILED DESCRIPTION

Figure 1:
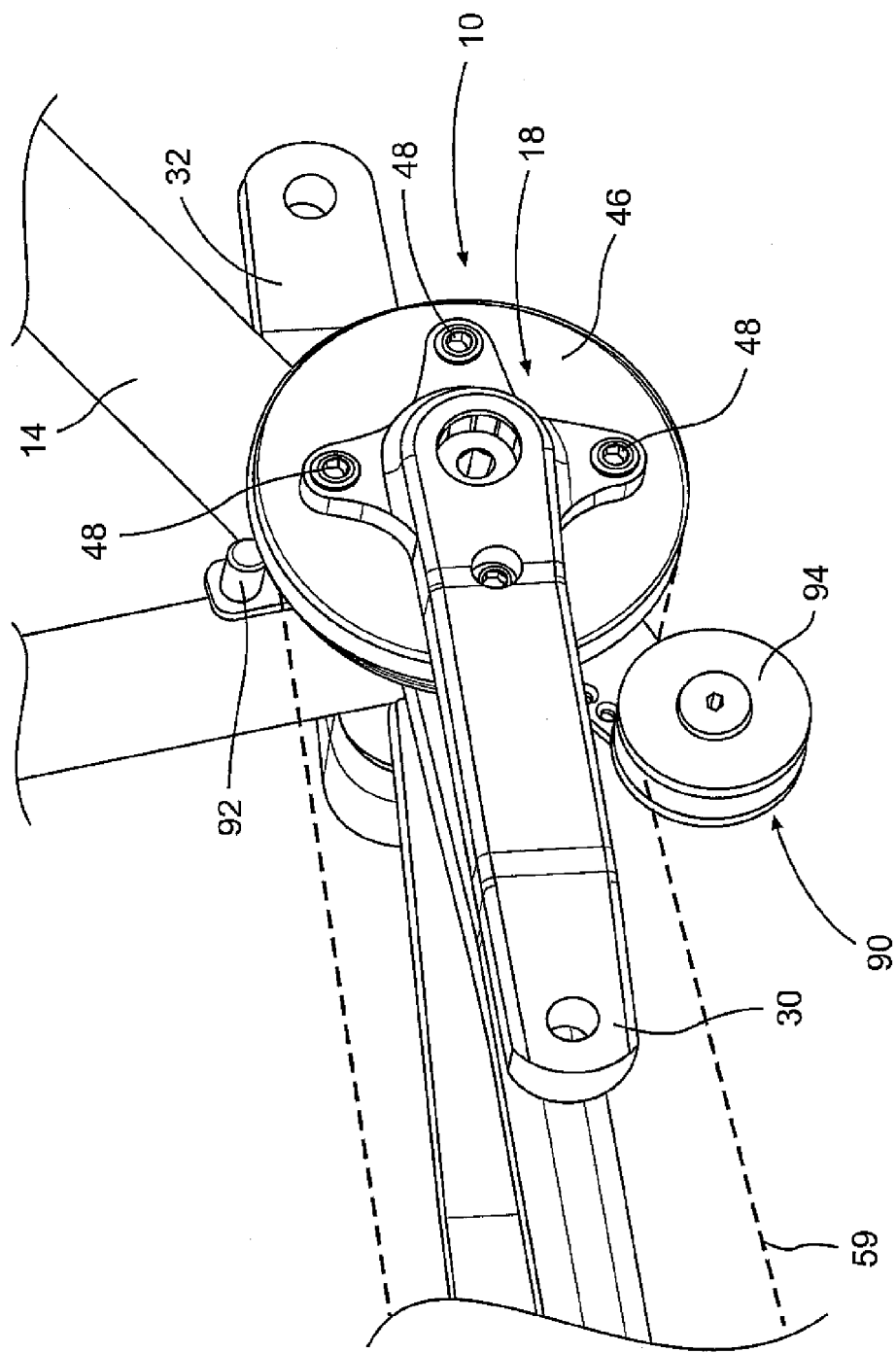
FIG. 1 is a perspective outboard view of a bicycle transmission assembly according to one embodiment of the present invention.

FIGS. 1-11 illustrate a bicycle transmission assembly 10 according to one embodiment of the present invention. Looking to FIGS. 1 and 2, the bicycle transmission assembly 10 is externally mounted to a bottom bracket shell 12 of a bicycle frame 14. Alternatively, the bicycle transmission assembly may be adapted for the rear wheel. The bottom bracket shell 12 has an axis 16 and connects various tubes of the bicycle frame 14. The bicycle transmission assembly 10 generally includes an input crank assembly 18, an output chainring 20, a planetary gear mechanism 22, a control system 24 and a mounting system 26. The crank assembly 18 is rotatably mounted to the bottom bracket shell 12. The crank assembly 18 includes a bottom bracket 28 that extends through the bottom bracket shell 12, with first and second crank arms 30, 32 rotatably connected to a crank axle 34. The bottom bracket 28 includes the crank axle 34 and bearings 36.

The planetary gear mechanism 22 is mounted coaxially about the shell axis 16 and disposed inboard of the first crank arm 30. The planetary gear mechanism 22 generally includes planet gears 38, a sun gear 40 and a ring gear 42. The planet gears 38 are rotatably supported on planet shafts 44 that are fixed to a carrier 46 and the first crank arm 30 by bolts 48. Looking to FIG. 5, the planet gears 38 mesh the sun gear 40 with the ring gear 42. The ring gear 42 includes a first plurality of teeth 50 engaged with teeth 51 of the planet gears 38 and a second plurality of teeth 52 engageable with ring pawls 54 located on the sun gear 40. The sun gear 40 includes a first plurality of teeth 56 engaged with the teeth 51 of the planet gears 38 and a second plurality of teeth 58 engageable with sun pawls 60 (see FIGS. 6-9). The sun and ring gears 40, 42 are rotatably mounted coaxially about the shell axis 16. The output chainring 20 is nonrotatably connected to the ring gear 42 (see FIG. 4). The output chainring 20 engages a bicycle drive chain 59 (see FIG. 3). The chainring 20 is aligned with a middle sprocket of a rear wheel sprocket cassette (not shown) to optimize shifting performance.

In this embodiment, the control system 24 is mounted coaxially about the shell axis 16 and generally includes the sun pawls 60, a first seat 65 for the pawls 60 and a shift actuator 64. The shift actuator 64 includes shift cams 68 and a lever 70 that is connected to a Bowden control cable (not shown). The shift cams 68 are received in a second seat 66. In this embodiment, the first and second seats 65, 66 are formed as recesses in a fixed collar 62. The shift cams 68 are reciprocally displaceable along the second seats 66. The sun gear 40 is coaxially rotatable about the collar 62.

The sun pawls 60 include a nose 71 and first and second pivot axes 73, 75. The nose 71 is engageable with the second plurality of teeth 58 formed as a toothed profile on the sun gear 40. The sun pawl 60 is rotatable by the shift cam 68 about the first pivot axis 73 between a first mode (FIG. 7), permitting the sun gear 40 to rotate relative to the collar 62 in a first direction A and a second direction B; and a second mode (see FIG. 6), preventing the sun gear 40 from rotating in the first direction A. The sun pawl 60 includes a first pawl lobe 81 that tracks along a cam profile 85 of the shift cam 68 as the shift cam 68 displaces the sun pawl 60 about the first pivot axis 73 between the first and second modes. Looking to FIG. 6, when the sun pawl 60 is in the second mode, a first engagement force $F_1$ is formed between the nose 71 of the sun pawl 60 and the teeth 58 preventing rotation of the sun gear 40 in the first direction A, the first engagement $F_1$ biasing the pawl 60 about the first pivot axis 73 toward the first mode. In addition, a spring 77 (omitted in FIG. 6 for clarity) may bias the sun pawl 60 at a second pawl lobe 79 about first pivot axis 73 toward the first mode, to disengage the sun pawl 60 from the sun gear 40. Although the sun pawl 60 is biased toward the first mode, the shift cam 68 engages the sun pawl 60 at the first pawl lobe 81, preventing the sun pawl 60 from disengaging the sun gear teeth 58. To disengage the sun pawl 60 from the sun gear 40, the control cable is actuated to displace the shift cam 68 along the second seat 66 to rotate the sun pawl 60 about the first pivot axis 73 toward the first mode (see FIG. 7).

Figure 8:
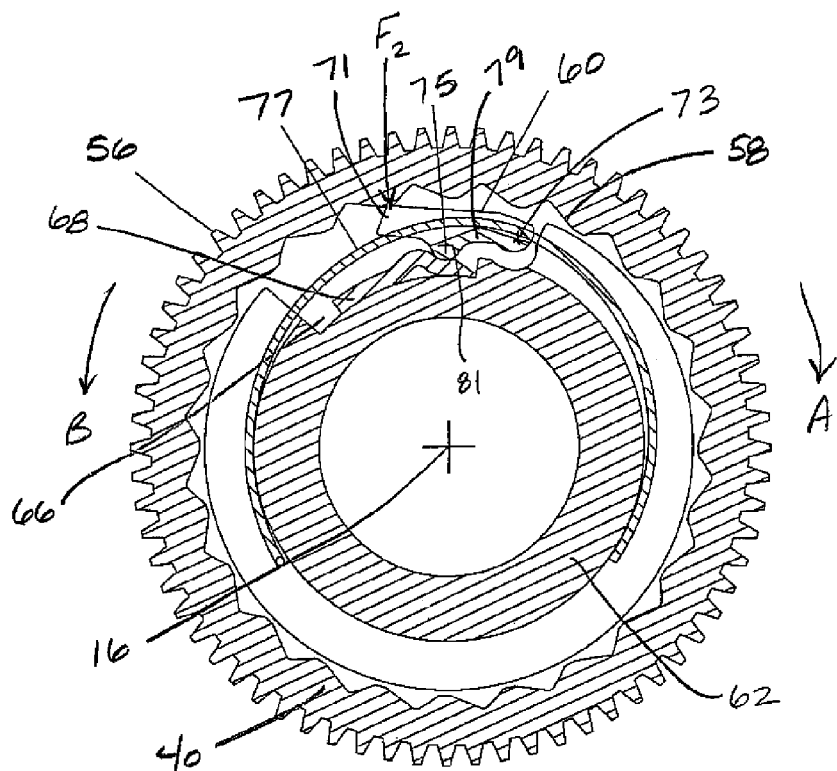
Figure 9:
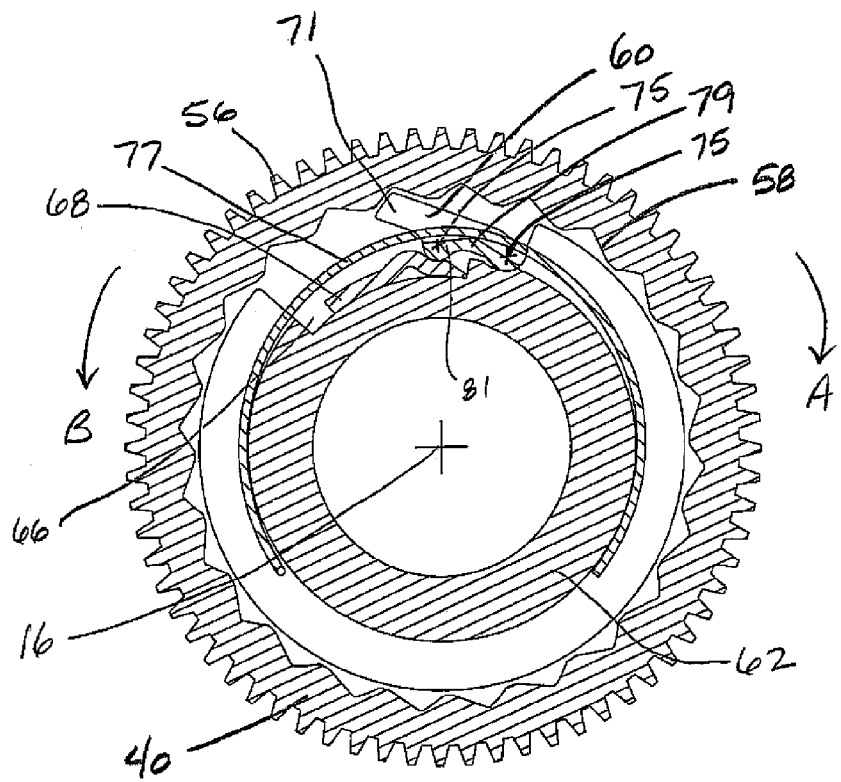

The sun pawl 60 is rotatable about the second pivot 75 to permit rotation of the sun gear 40 in the second direction B when the sun pawl 60 is in the second mode (see FIG. 8). When the sun gear is driven in the second direction B and the sun pawl 60 is in the second mode, a second engagement force $F_2$ generated between the nose 71 of the sun pawl 60 and the teeth 58 of the sun gear 40 as the sun pawl 60 is overridden by the sun gear 40 rotating in the second direction B (see FIG. 8). As the sun gear 40 rotates in the direction B, the spring 77 biases the sun pawl 60 at the second pawl lobe 79 about the second pivot axis 75 toward the second mode (see FIG. 9). So configured, the sun gear 40 is permitted to freely rotate in the direction B when the rider backpedals, even when the sun pawl 60 is in the second mode.

Figure 10:
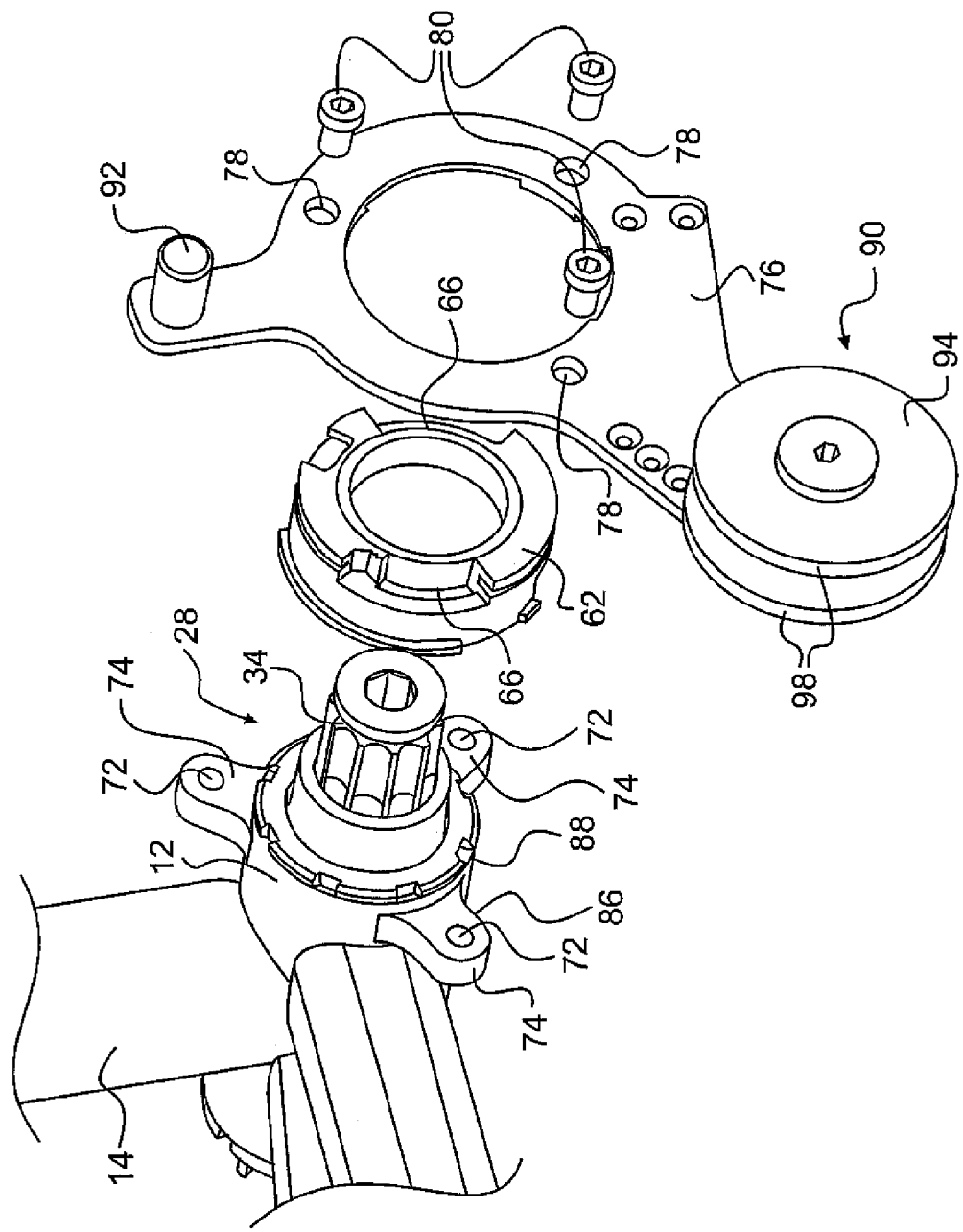
FIG. 10 is an exploded outboard view of a portion of the bicycle transmission assembly of FIG. 1.
Figure 11:
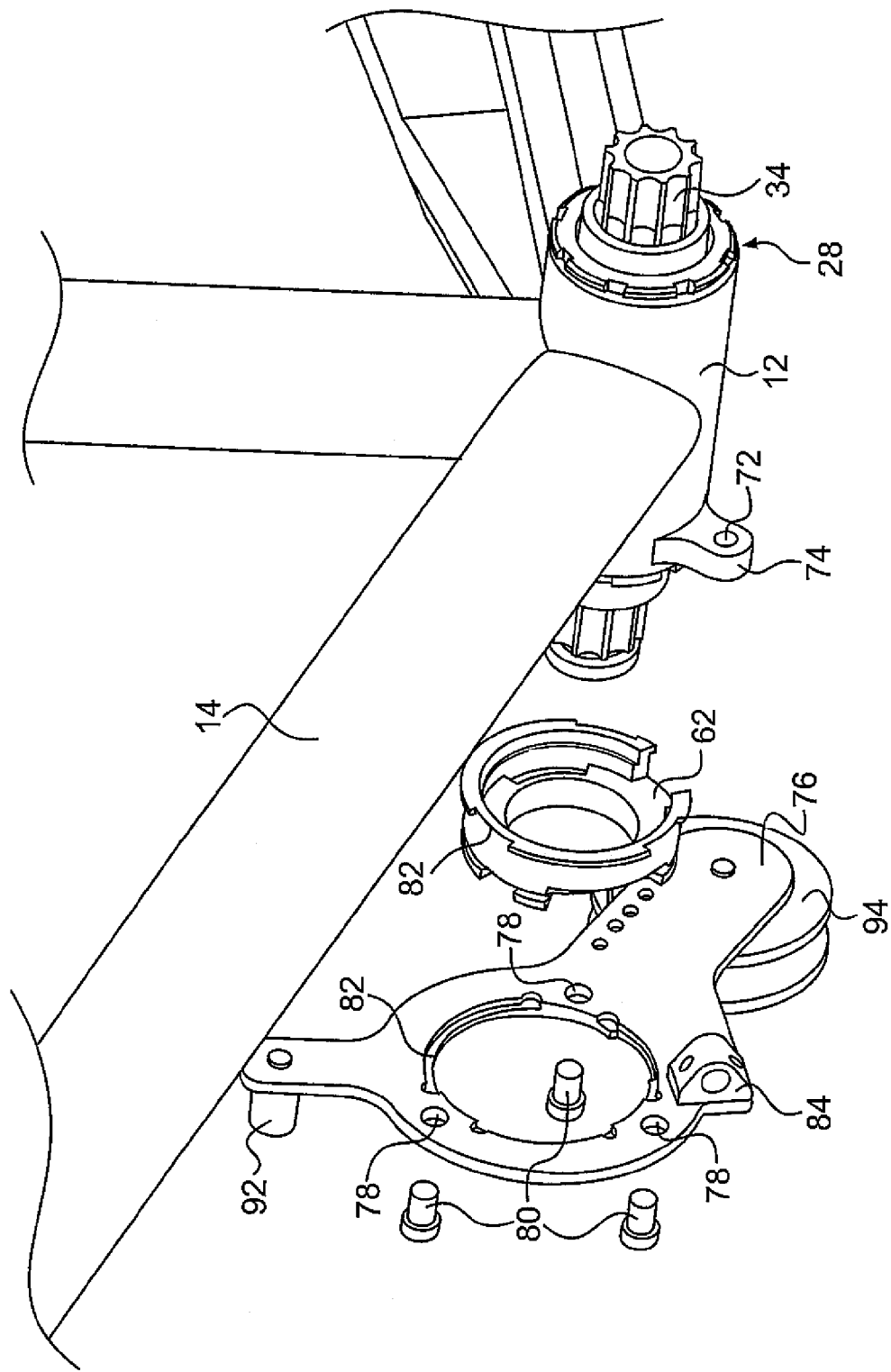
FIG. 11 is an exploded inboard view of a portion of the bicycle transmission assembly of FIG. 1.

Looking to FIGS. 10 and 11, the mounting system 26 includes at least one attachment point 72 disposed on at least one frame boss 24 extending radially outwardly from the bottom bracket shell 12. The mounting system 26 may include three attachment points 72 disposed on three frame bosses 74 that are equidistantly spaced about the bottom bracket shell 12 or about 120 degrees apart. The mounting system 26 also includes a mounting plate 76 mounted axially about the shell axis 16. The mounting plate 76 includes three holes 78 for receiving bolts 80 to mount the plate 76 to the frame bosses 74. The mounting plate 76 and collar 62 includes mating projections and recesses 82 to nonrotatably connect the collar to the mounting plate 76. The mounting plate 76 may include a cable housing stop 84 for the Bowden control cable connected to the lever 70.

Figure 3:
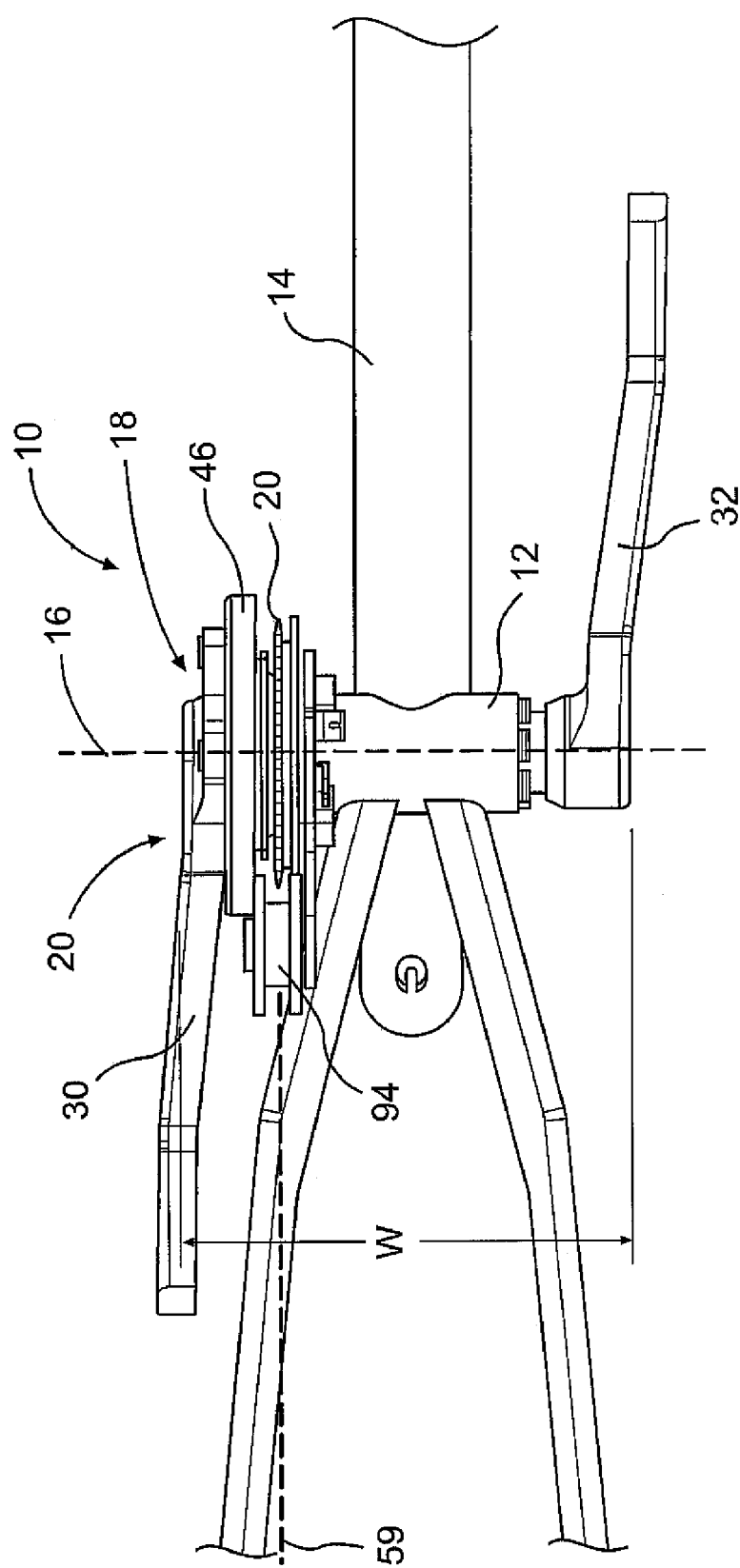
FIG. 3 is a bottom view of the bicycle transmission assembly of FIG. 1.
Figure 4:
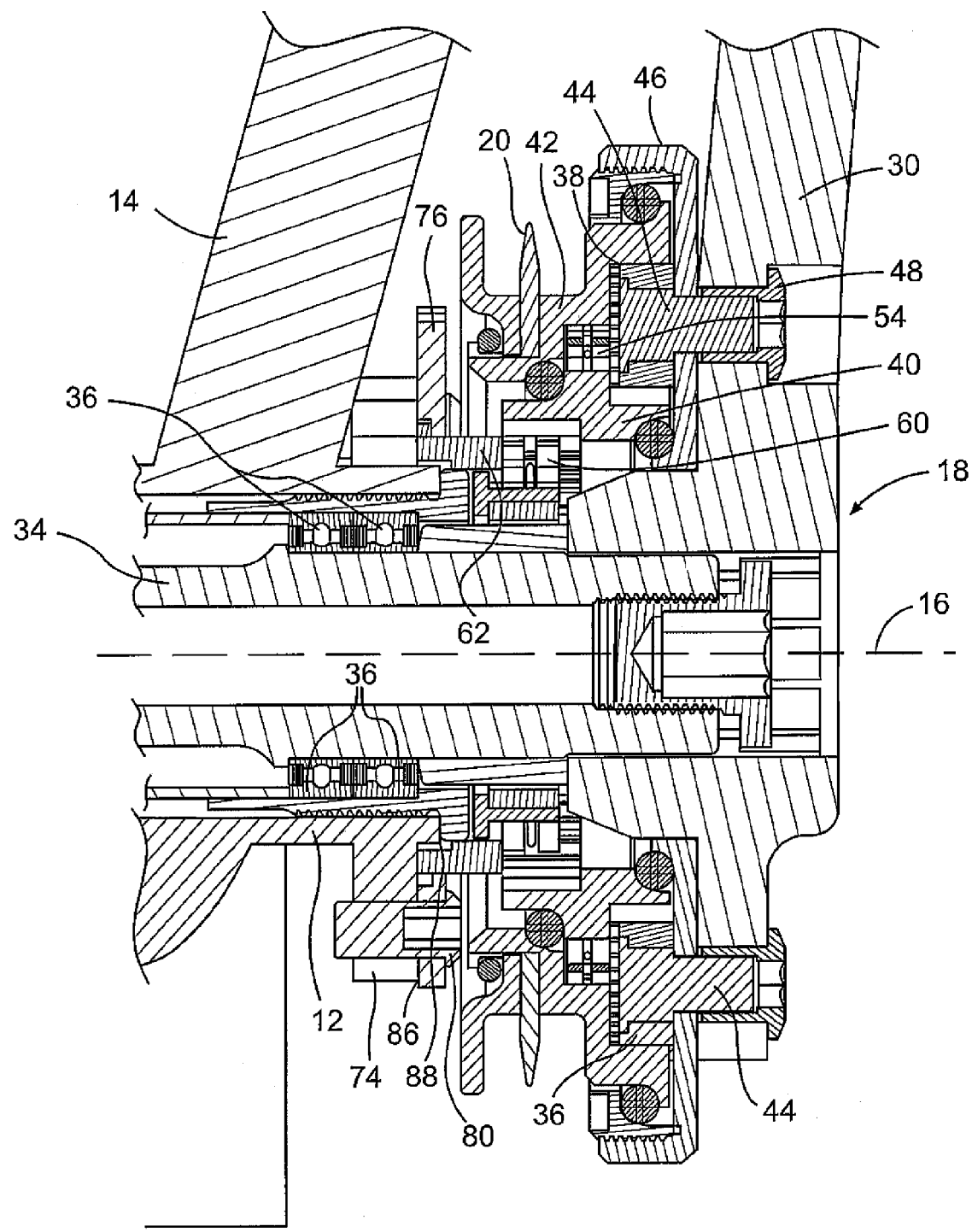
FIG. 4 is a cross-sectional view of the bicycle transmission assembly of FIG. 1.
Figure 5:
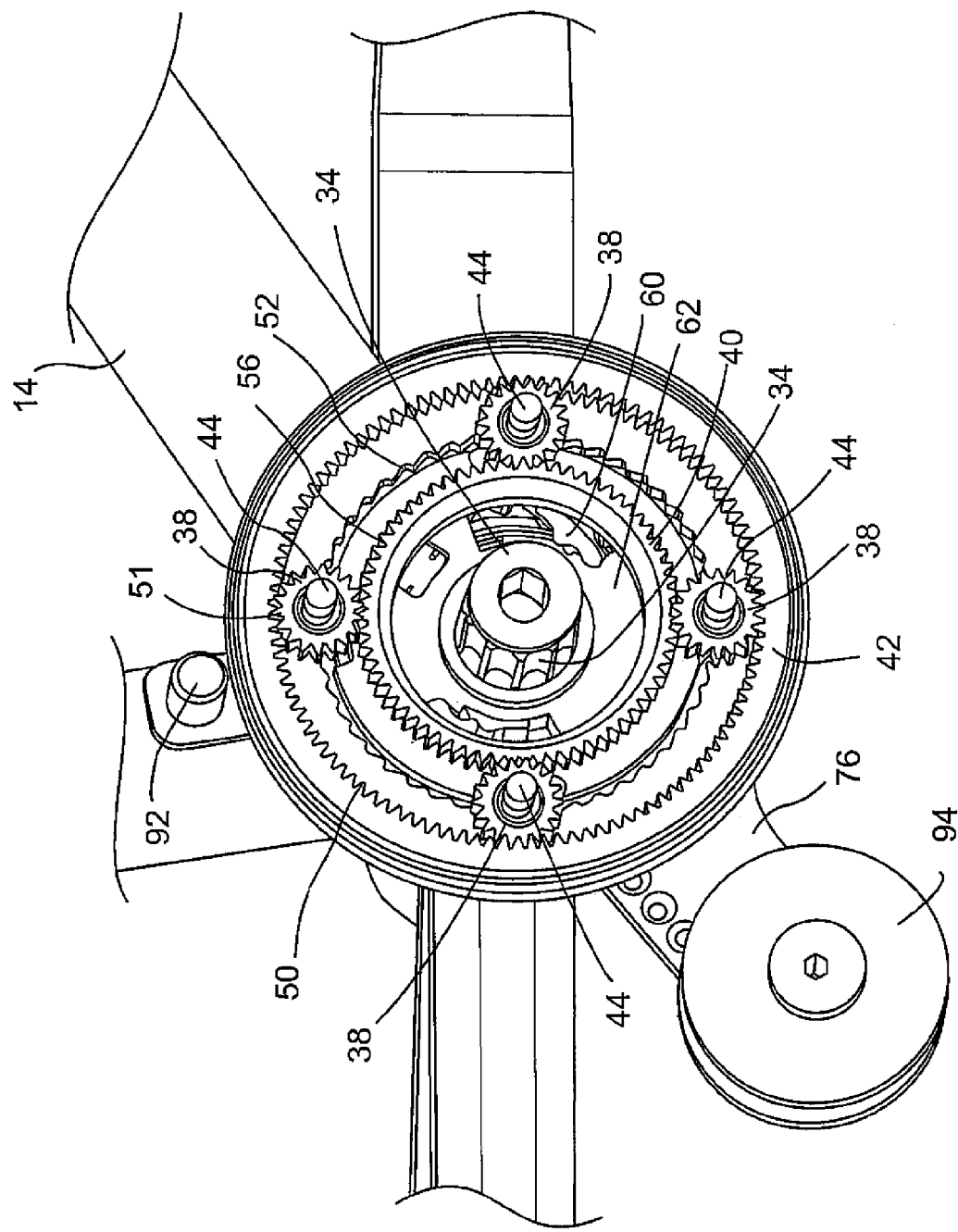
FIG. 5 is a cut-away view of the bicycle transmission assembly of FIG. 1.
Figure 6:
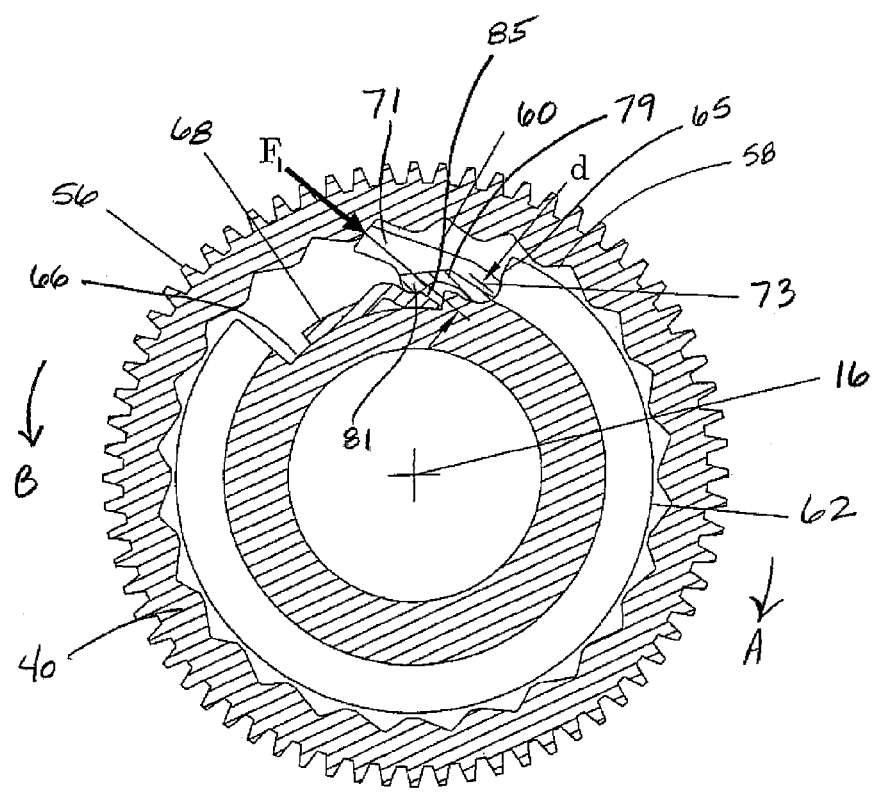
FIGS. 6-9 are representative cross-sectional views of a sun pawl shown in different modes relative to a sun gear of the bicycle transmission assembly of FIG. 1.
Figure 7:
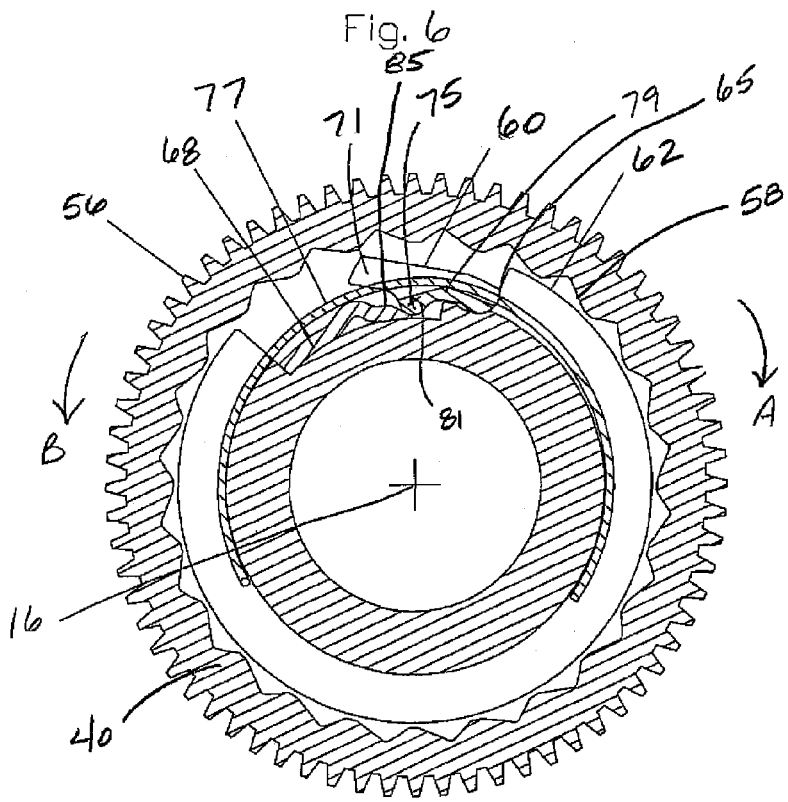

By providing attachment points 72 on the frame bosses 74 extending radially from the bottom bracket shell 12, the bicycle transmission assembly 10 may be mounted without increasing the existing crank assembly width W (see FIG. 3). In the embodiment shown, an outboard surface 86 of the attachment point 72 is positioned axially inboard of an outboard surface 88 of the bottom bracket shell 12.

Figure 2:
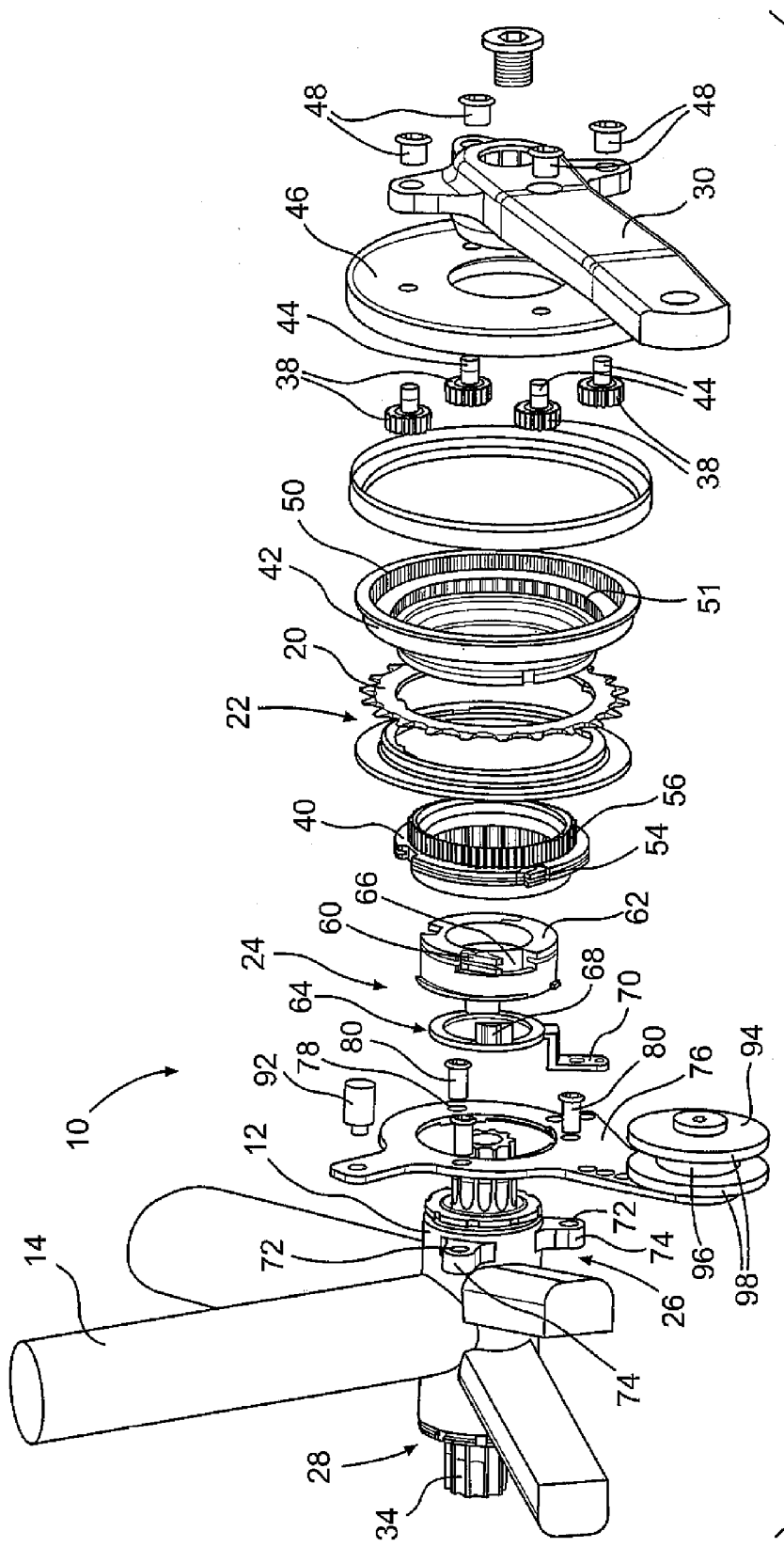
FIG. 2 is an exploded view of the bicycle transmission assembly of FIG. 1.

Looking to FIGS. 1, 2 and 8, in one embodiment of the present invention, a chain management system 90 is attached to the mounting plate 76. The chain management system 90 includes a chain guide 92 for preventing disengagement of the chain 90 includes a chain guide 92 for preventing disengagement of the chain 59 from the output chainring and/or a roller 94 rotatably attached to the mounting plate 76 for rollingly guiding the chain 59. The chain 59 runs under the chain guide 92. The roller 94 includes a roller portion 96 for the chain 59 to ride on the two sidewalls 98 to axially position the chain 59. The roller 94 is aligned with the chainring 20. In other embodiments, the roller 94 may be mounted to alternative positions on the mounting plate 76.

The bicycle transmission assembly 10 provides at least two transmission paths. When the sun pawl 60 is in the second mode, the sun gear 40 is locked to the collar 62, wherein rotation of the input crank assembly 18 drives the planet gears 38 to rotate about the planet shafts 44 thereby overdriving the ring gear 42, resulting in the output chainring 20 being rotated faster than the input crank arms 18. When the sun pawl 60 is in the first mode, the sun gear 40 is unlocked from the collar 62, and initial rotation of the input crank assembly 18 first drives the planet gears 38 to rotate about the planet shafts 44 thereby rotating the sun gear 40 until the ring pawls 54 engage the ring gear 42 thereby locking the sun gear 40 to the ring gear 42. Continued rotation of the crank assembly 18, directly drives the both the sun and ring gears 40, 42 in a 1:1 gear ratio.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A pawl for controlling the rotation of a gear of a planetary gear mechanism, the pawl comprising:
    a nose engageable with the gear;
    a first pivot axis about which the pawl is rotatable between a first mode permitting rotation of the gear in a first direction and a second direction and a second mode preventing rotation of the gear in the first direction; and
    a second pivot axis about which the pawl is rotatable to permit rotation of the gear in the second direction while the pawl is in the second mode.

2. The pawl of claim 1, wherein the pawl is biased about the first pivot axis toward the first mode and biased about the second pivot axis toward the second mode.

3. The pawl of claim 2, wherein the pawl is biased at a pawl lobe about the first pivot axis toward the first mode and biased at the pawl lobe about the second pivot axis toward the second mode.

4. The pawl of claim 3, wherein the pawl lobe is disposed between the first and second pivot axes.

5. A control system for a bicycle planetary gear mechanism having a plurality of gears, the control system comprising:
    a pawl including:
        a nose engageable with one of the plurality of gears,
        a first pivot axis about which the pawl is rotatable between a first mode permitting rotation of the one of the plurality of gears in a first direction and a second direction and a second mode preventing rotation of the one of the plurality of gears in the first direction, and a second pivot axis about which the pawl is rotatable to permit rotation of the one of the plurality of gears in the second direction while the pawl is in the second mode;

a first seat for the pawl; and a shift actuator for positioning the pawl between the first and second modes.

6. The control system of claim 5, wherein the pawl is biased about the first pivot axis toward the first mode and biased about the second pivot axis toward the second mode.

7. The control system of claim 6, wherein the one of the plurality of gears includes a toothed profile configured to engage the nose of the pawl.

8. The control system of claim 7, wherein the toothed profile of the one of the plurality of gears and the nose of the pawl are configured such that a first engagement force between the nose and the toothed profile, preventing rotation of the one of the plurality of gears in the first direction, biases the pawl toward the first mode.

9. The control system of claim 8, wherein the toothed profile and the nose of the pawl are configured such that a second engagement force between the nose and the toothed profile biases the pawl about the second pivot axis toward the first mode permitting rotation of the one of the plurality of gears in the second direction.

10. The control system of claim 9, further comprising a spring configured to bias the pawl at a pawl lobe about the first pivot axis toward the first mode.

11. The control system of claim 10, wherein the spring is configured to bias the pawl at the pawl lobe about the second pivot axis toward the second mode.

12. The control system of claim 11, wherein the pawl lobe is disposed between the first and second pivot axes.

13. The control system of claim 11, wherein the shift actuator includes a shift cam received in a second seat and reciprocally displaceable along the second seat to position the pawl between the first and second modes.

14. The control system of claim 9, wherein the spring is configured to bias the pawl at a pawl lobe about the second pivot axis toward the second mode.

15. The control system of claim 5, wherein the planetary gear mechanism includes a sun gear, a plurality of planet gears and a ring gear.

16. The control system of claim 15, wherein the one of the plurality of gears is the sun gear, the planetary gear mechanism configured such that when the pawl is in the second mode, a drive input drives the planet gears to overdrive the ring gear in a first transmission path.

17. The bicycle transmission assembly of claim 16, wherein the planetary gear mechanism is configured such that when the pawl is in the first mode, the drive input drives the planet gears to rotate the sun gear and the ring gear in a second transmission path.

* * * * *